(12) United States Patent
Fujita

(10) Patent No.: US 7,899,041 B2
(45) Date of Patent: Mar. 1, 2011

(54) MULTIPLEXING METHOD AND APPARATUS, DEMULTIPLEXING METHOD AND APPARATUS, AND ACCESS NETWORK SYSTEM

(75) Inventor: Yoshitaka Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 1514 days.

(21) Appl. No.: 10/050,600

(22) Filed: Jan. 18, 2002

(65) Prior Publication Data

US 2002/0110124 A1 Aug. 15, 2002

(30) Foreign Application Priority Data

Jan. 22, 2001 (JP) ............................. 2001-012997

(51) Int. Cl.
*H04L 12/28* (2006.01)
*H04J 3/16* (2006.01)

(52) U.S. Cl. .................... 370/389; 370/392; 370/395.1; 370/401; 370/466

(58) Field of Classification Search ......... 370/532–534, 370/536–544, 389, 392, 399, 470
See application file for complete search history.

(56) References Cited

U.S. PATENT DOCUMENTS

| 6,445,715 | B1 * | 9/2002 | Annaamalai et al. | ......... 370/466 |
|---|---|---|---|---|
| 6,493,348 | B1 * | 12/2002 | Gelman et al. | .............. 370/401 |
| 6,563,816 | B1 * | 5/2003 | Nodoushani et al. | ........ 370/352 |
| 6,580,727 | B1 * | 6/2003 | Yim et al. | .................... 370/463 |
| 6,760,328 | B1 * | 7/2004 | Ofek | .......................... 370/389 |
| 6,765,910 | B1 * | 7/2004 | Johnson | ..................... 370/394 |
| 6,771,662 | B1 * | 8/2004 | Miki et al. | .................. 370/469 |
| 6,778,561 | B1 * | 8/2004 | Jha | ............................. 370/537 |
| 6,829,250 | B2 * | 12/2004 | Voit et al. | ................... 370/467 |
| 6,829,252 | B1 * | 12/2004 | Lewin et al. | ................ 370/493 |
| 6,904,054 | B1 * | 6/2005 | Baum et al. | ................. 370/467 |
| 6,977,930 | B1 * | 12/2005 | Epps et al. | ................... 370/392 |
| 7,583,665 | B1 * | 9/2009 | Duncan et al. | .............. 370/389 |
| 7,616,646 | B1 * | 11/2009 | Ma et al. | .................... 370/401 |

(Continued)

FOREIGN PATENT DOCUMENTS

JP 2002-64587 2/2002

OTHER PUBLICATIONS

WO 02/17542 A2, System and Method of Binding MPLS Labels to Virtually Concatenated SONET/SDH Transport Connections, Geyser Networks, INC, Feb. 28, 2002.*
Banguchi, T.. "ADSL (2)", Unix Magazine, vol. 15, No. 2, ASCII Co., Ltd., pp. 37-46. Feb. 1, 2000.

(Continued)

*Primary Examiner*—Huy D Vu
*Assistant Examiner*—Brandon Renner
(74) *Attorney, Agent, or Firm*—McGinn IP Law Group, PLLC

(57) ABSTRACT

In a multiplexing method of multiplexing communication signals from communication signal transmitting sections and transmitting a multiplexed signal to a multiplexed signal receiving section, each of the communication signals, an identification address preassigned to a predetermined signal identifying section through which a communication signal passes in a multiplexing system including the communication signal transmitting section and the multiplexed signal receiving section is added to each communication signal. The resultant signal is output. The identification address is extracted from each output signal. The respective communication signals are multiplexed on the basis of the extracted identification addresses. A multiplex apparatus, access network system, protocol termination apparatus, and multiplexing/demultiplexing apparatus are also disclosed.

28 Claims, 11 Drawing Sheets

U.S. PATENT DOCUMENTS

| | | | |
|---|---|---|---|
| 2002/0027906 A1* | 3/2002 | Athreya et al. | 370/386 |
| 2002/0059424 A1* | 5/2002 | Ferguson et al. | 709/226 |
| 2002/0085591 A1* | 7/2002 | Mesh et al. | 370/535 |
| 2004/0071216 A1* | 4/2004 | Richardson et al. | 375/240.21 |
| 2004/0264505 A1* | 12/2004 | Miki et al. | 370/469 |
| 2005/0157711 A1* | 7/2005 | O'Dell et al. | 370/386 |

OTHER PUBLICATIONS

"ATM Access Line for LAN Use", Nikkei Communication, No. 283, Nikkei BP Co., pp. 101-107, Dec. 7, 1998.

Japanese Office Action dated May 18, 2004 with Partial English Translation.

Masato Sasaki, et al., "Design of Access VPN Systems", Electronic Information Communication Association Technology Research Report, CS2000-51, Sep. 15, 2000, pp. 31-36.

* cited by examiner

| 61: | 4n: | 2nm: |
|---|---|---|
| AG | DSLM | ATU-R |
| IP |  | IP |
| PPP |  | PPP |
| MAC | MAC | MAC |
| PHY | PHY | PHY |
FIG. 5
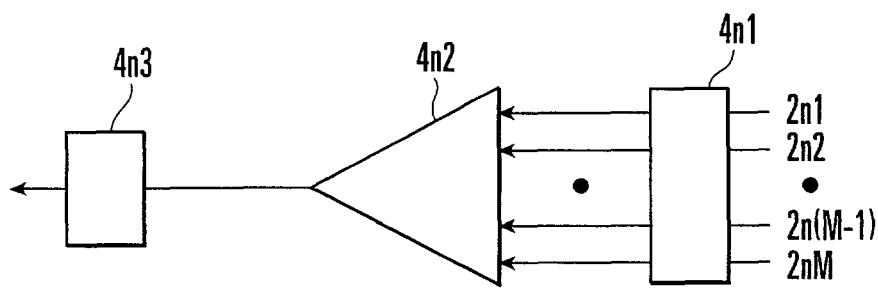
FIG. 6
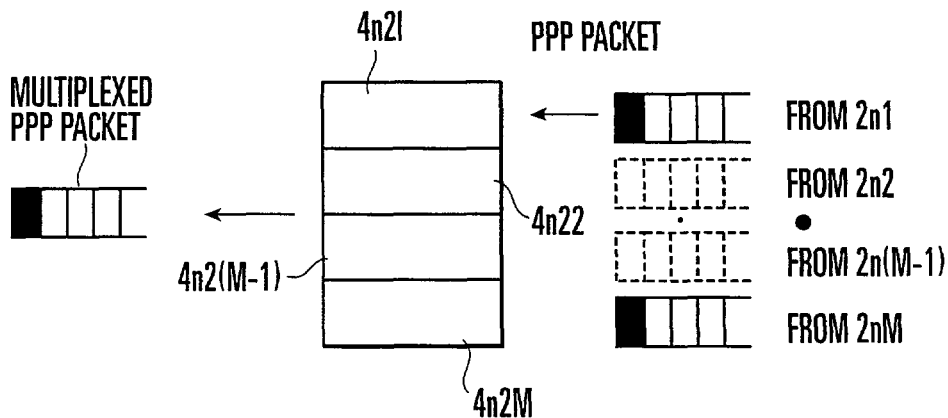
FIG. 7

| VALUE OF PROTOCOL FIELD | CONTENTS OF PACKET DATA |
|---|---|
| 0021 | IP |
| 8021 | INTERNET PROTOCOL CONTROL PROTOCOL (NETWORK CONTROL PROTOCOL FOR IP) |
| c021 | LCP (LINK CONTROL PROTOCOL) |
FIG.21
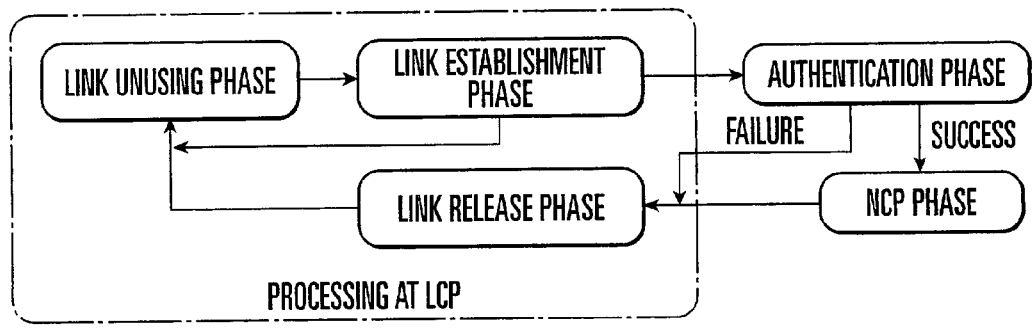
FIG.22
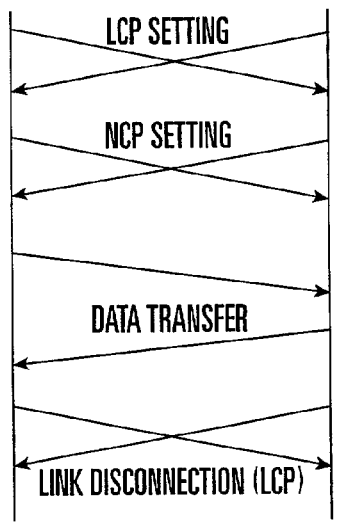
FIG.23

MULTIPLEXING METHOD AND APPARATUS, DEMULTIPLEXING METHOD AND APPARATUS, AND ACCESS NETWORK SYSTEM

BACKGROUND OF THE INVENTION

The present invention relates to a multiplexing method and apparatus, demultiplexing method and apparatus, access network system, subscriber multiplexing/demultiplexing apparatus, and protocol termination apparatus, which multiplex PPP packets on the basis of MAC addresses and the like, demultiplex the packets on the basis of IP addresses, and simplify an arrangement required for PPP processing by using these multiplexing and demultiplexing processes.

Conventionally, in the Internet, prior to data communication upon forming a communication path between two terminals connected to the Internet, the terminals must be connected to a backbone network through an access network. For this connection, the Point-to-Point Protocol (PPP) is used.

An outline of PPP in an access network will be described first.

In connection to the Internet, each subscriber must terminate PPP for transferring an IP (Internet Protocol) packet in response to an Internet access request. PPP serves to perform authentication, accounting, service management system (SMS) operation, subscriber-specific band allocation, and the like. Any subscriber who is not authenticated/registered cannot form a link itself, and hence can neither transfer data nor receive an IP address itself. Accounting corresponds to a connection time.

PPP is also used in an Internet backbone network. Unlike PPP used in the access network, this PPP serves to, for example, determine a maximum packet length: MTU (Maximum Transfer Unit) size of packets to be exchanged between the backbone network and the access network.

In order to transmit IP data to the backbone network through the access network connected to the backbone network, PPP termination must be performed in each access network. Conventionally, PPP termination is performed at an entrance to an ISP (Internet Service Provider). PPP termination itself has been handled in the conventional access network systems by installing dedicated units (FIG. 19).

The conventional access network system shown in FIG. 19 is comprised of an ATU (Address Transformation Unit)-R 20*l*, DSLAM (Digital Subscriber Line Access Multiplexer) 30*m*, ATM SW (Asynchronous Transfer Mode Switch) 40*n*, and PPP termination apparatus 50*l*. A PC (Personal Computer) 10*k* is connected to the ATU-R 20*l*. Note that l of 20*l* suffixed to ATU-R indicates that there are 1 to P ATU-Rs, m of 30*m* suffixed to DSLAM indicates that there are 1 to Q DSLAMs, and n of 40*n* suffixed to ATM SW indicates that there are 1 to R ATM SWs. Reference numeral 4101 denotes an ADSL (Asynchronous Digital Subscriber Line)/VDSL (Very high speed Digital Subscriber Line); 5101, an ATM OC-3c interface; and 6101, an ATM OC-12c interface.

PPP is a protocol for supporting data transfer using a multiprotocol through a communication path between the ATU-R 20*l* and PPP termination apparatus 50*l* of the access network system. When PPP processing starts, an LCP (Link Control Protocol) packet of the PPP control packets shown in FIG. 22 is transmitted as a PPP packet transmitted from the ATU-R 20*l* to the PPP termination apparatus 50*l*. Whether a given packet is an LCP packet is determined depending on whether the value in the protocol field in the PPP packet is c021. A link is established on the basis of this LCP packet. A user is authenticated concerning the established link.

An NCP (Network Control Protocol) packet is then transmitted, and IP address distribution processing and the like for data transfer to an upper layer are performed on the basis of this NCP packet. Whether a given packet is an NCP packet is determined depending on whether the value in the protocol field in the PPP packet is 8021.

Transfer of an IP packet in which user packet data is inserted is started on the basis of the IP address distributed to the established and authenticated link afterward. The above description is based on the IETF (Internet Engineering Task Force) Documents RFC 1161/1162/1332.

As a frame format used for PPP processing, an HDLC (High Data Link Control Procedure) frame configuration is used. A 32-bit protocol field is added first to the payload of this frame configuration, and then an IP packet is inserted as packet data in the configuration, thereby forming an overall PPP packet.

The above link establishment processing will be described in detail to some extent.

A link protocol for performing link establishment processing before transmission of an IP packet is subordinate to the IP layer (FIG. 20).

As shown in FIG. 22, in link establishment processing, when an Internet access request is generated, control on the link unusing phase advances to the link establishment phase and moves to the authentication phase. The processing so far corresponds to LCP setting in FIG. 23.

When the processing in the authentication phase is properly performed, control is transferred to the NCP phase to perform the above IP address distribution processing and the like. With this operation, a link is established. This processing corresponds to NCP setting in FIG. 23.

After this link establishment processing, transfer of the above IP packet is started. The IP packet is contained in a PPP packet, and the resultant PPP packet is transmitted. With this operation, the IP packet is transmitted. Whether the PPP packet is a PPP data packet is determined depending on whether the value in the protocol field is 0021.

As described above, in both link establishment and IP packet transmission, each PPP packet to be transmitted is created upon addition of a PPP header thereto on the PPP layer of the ATU-R 20*l*. In addition, this packet is formed into an ATM cell on the AAL5 (ATM Adaptation Layer Type 5) layer and transmitted to the DSLAM 30*m* through the PHY layer (FIG. 20).

The DSLAM 30*m* which receives the ATM cell also performs predetermined processing, on the ATML5 layer, for the ATM cell input through the PHY layer. Similar processing is performed in the ATM SW 40*n* and PPP termination apparatus 50*l* (FIG. 20).

If, therefore, an overall access network system is formed by using the AAL5 layer (FIG. 20), since the PPP frame whose ATM cell has been subjected to frame header addition processing (PPP Encapsulation) is transmitted, SAR (Segmentation and Reassembly Sublayer) on the AAL5 layer must be performed first to terminate PPP. With this SAR processing, an original PPP frame is reassembled or processing for link establishment is performed by the CPU of the PPP termination apparatus 50*l*. After link establishment, the subscriber can transfer the IP packet to a backbone network 60*l*.

The following problems, however, arise in the prior art described above.

In the prior art, as described above, an apparatus (the PPP termination apparatus 50*l* in FIG. 19) which discriminates each subscriber who tries to access the Internet and has a function for ATM processing must be installed at an entrance to the backbone network 60*l*. Such an apparatus must be added every time the number of subscribers increases. In addition, the PPP termination apparatus 50*l* is often installed near the backbone network 60*l* to which packets from many subscribers are sent upon multiplexing.

According to the access network system like the one shown in FIG. 19, since the overall access network system is formed by using the AAL5 layer, the overall system inevitably becomes complicated.

As the number of subscribers who access the Internet increases, an apparatus for performing PPP processing as processing indispensable to connection of the subscribers to the backbone network of the Internet must be added. Such an apparatus may be installed in a place as near to the subscribers as possible, i.e., in an apparatus for providing Internet services (e.g., the ATM SW 40*n* in FIG. 19). In this case, it is required to avoid complication of PPP, complication of its system, complication of a management system for the system, and the like.

SUMMARY OF THE INVENTION

The present invention has been made in consideration of the above situation, and has as its object to provide a multiplexing method and apparatus, demultiplexing method and apparatus, access network system, subscriber multiplexing/demultiplexing apparatus, and protocol termination apparatus which can multiplex PPP packets on the basis of MAC addresses and the like, demultiplex the packets on the basis of MAC or IP addresses, and simplify an arrangement for PPP processing by using these multiplexing and demultiplexing processes.

In order to achieve the above object, according to the present invention, there is provided a multiplexing method of multiplexing communication signals from communication signal transmitting sections and transmitting a multiplexed signal to a multiplexed signal receiving section, comprising the steps of adding, to each of the communication signals, an identification address preassigned to a predetermined signal identifying section through which a communication signal passes in a multiplexing system including the communication signal transmitting section and the multiplexed signal receiving section and outputting each of the communication signals, extracting the identification address from each output signal, and multiplexing the respective communication signals on the basis of the extracted identification addresses.

BRIEF DESCRIPTION OF THE DRAWINGS

FIG. 5 is a view showing a protocol stack;

FIG. 6 is a block diagram schematically showing the functions of the ADSL/VDSL interface block, multiplexing clock, and Ethernet/IEEE 802.3 interface block shown in FIG. 2;

FIG. 7 is a view showing the process of upward multiplexing in the subscriber multiplexing/demultiplexing apparatus;

FIG. 21 is a view showing the contents of packet data in correspondence with the values of protocol fields in PPP packets;

FIG. 22 is a view showing PPP link processing; and

FIG. 23 is a view showing a PPP processing sequence.

DESCRIPTION OF THE PREFERRED EMBODIMENTS

The present invention will be described in detail below with reference to the accompanying drawings.

First Embodiment

Figure 1:
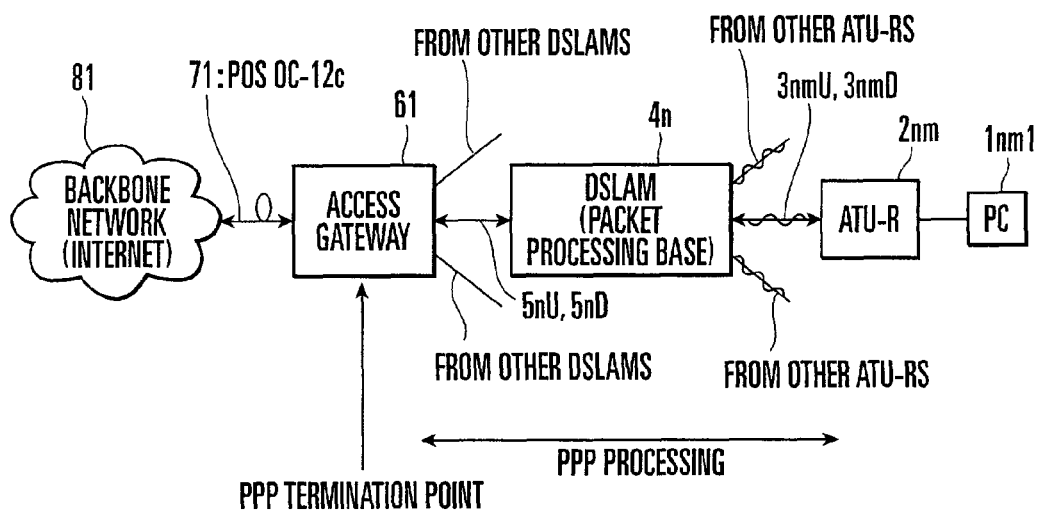
FIG. 1 is a block diagram showing the electrical arrangement of an access network system according to the first embodiment of the present invention.

An access network system 10 according to this embodiment is a system for performing PPP processing by using the MAC layer and roughly comprised of a subscriber apparatus (ATUU-R) 2*nm*, subscriber multiplexing/demultiplexing apparatus (DSLAM) 4*n*, and an access gateway (AG) 61, as shown in FIG. 1. A personal computer 1*nml* is connected to the subscriber apparatus 2*nm* of this system and designed as a whole such that Internet communication can be performed by connecting a backbone network 81 to the access gateway 61 through a POS OC-12C interface 71. POS of the POS OC-12C interface 71 is an abbreviation for packet over SDH/SONET (Synchronous Digital Hierachy/Synchronous Optical Network), and OC-12 stands for a communication speed, which is 620 Mb/s.

Note that n of reference numeral 4*n* of the DSLAM 4*n* indicates that a predetermined number of subscriber multiplexing/demultiplexing apparatuses, i.e., 1 to N subscriber multiplexing/demultiplexing apparatuses, are connected to the access gateway 61.

In addition, m of reference numeral 2nm of the subscriber apparatus 2nm indicates that a predetermined number of subscriber apparatuses, i.e., 1 to M subscriber apparatuses, which is equal to or different from n, are connected to the subscriber multiplexing/demultiplexing apparatuses 4n, respectively.

Figure 14:
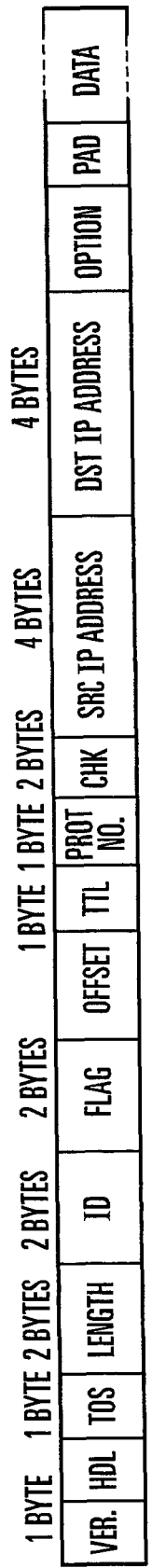
FIG. 14 is a view showing the format of an IP packet.

Furthermore, l of reference numeral 1nml of the personal computer 1nml indicates that a predetermined number of personal computers, i.e., 1 to l personal computers, which is equal to or different from m, are connected to the subscriber apparatuses 2nm, respectively. FIG. 14 shows the format of an IP packet. The abbreviations in FIG. 14 are known notations.

The personal computer 1nml is an Internet terminal apparatus, which designed to output an IP (Internet Protocol) packet to the subscriber apparatus ATU (Address Transformation Unit)-R 2nm.

Figure 13:
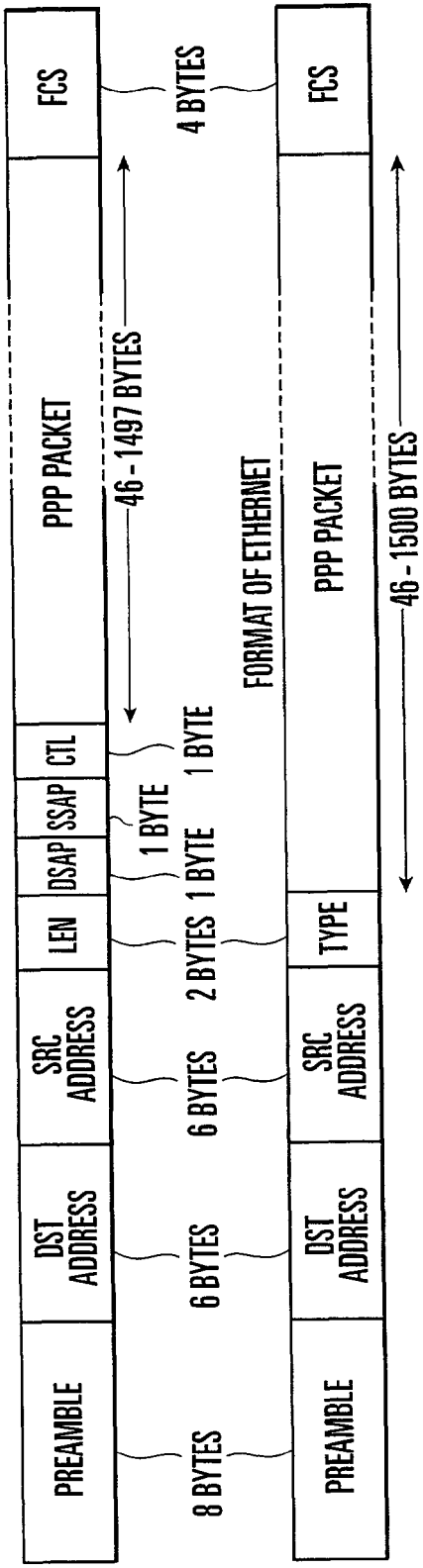
FIG. 13 is a view showing the difference between the format of an Ethernet frame and the format of an IEEE 802.3 frame.

The subscriber apparatus 2nm adds a PPP (Point-to-Point Protocol) header (PPP of ATUU-R in FIG. 5) to the IP packet transmitted from the personal computer 1nml, and then adds the frame header of an Ethernet/IEEE 802.3 frame (MAC of ATUU-R in FIG. 5) to form an Ethernet/IEEE 802.3 frame packet. In this case, the Ethernet/IEEE 802.3 frame is a frame on which the PPP packet formed by adding a PPP header to an IP packet is set. This frame may be an Ethernet frame or IEEE 802.3 frame. FIG. 13 shows the formats of an Ethernet frame and IEEE 802.3 frame. The abbreviations in FIG. 13 are known notations.

The subscriber apparatus 2nm performs analog modulation of a signal on which an Ethernet/IEEE 802.3 frame packet having the frame header of an Ethernet/IEEE 802.3 frame added thereto is carried. With this operation, the signal is converted into a 100-Kb/s ADSL/VDSL signal and output. In this case, the ADSL/VDSL signal has a signal form used for the transmission of an Ethernet/IEEE 802.3 frame packet. This indicates that either an ADSL signal or a VDSL signal may be used.

The above frame header contains a MAC address. This MAC address includes a source identification address (SRC MAC Address) (the identification address of a predetermined identification section through which a communication signal passes in the multiplex system) at which a signal is output from the subscriber apparatus 2nm, and a predetermined destination identification address (DSC MAC Address) (the identification address of a signal identification section through which a communication signal passes in the multiplex system) at which a signal is input the subscriber multiplexing/demultiplexing apparatuses 4n. As a source identification address and destination identification address, the addresses of apparatuses from/to which signals are output/input or the addresses of the ports of apparatuses from/to which signals are output/input are used. These apparatuses or ports themselves correspond to the above signal identification section.

An example of how a MAC address is added will be described below with reference to FIG. 4.

Figure 4:
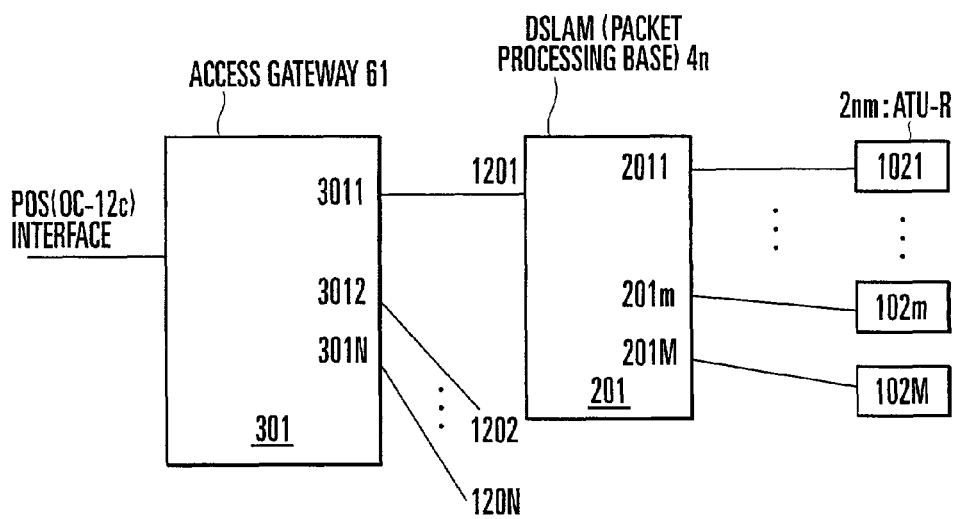
FIG. 4 is a block diagram showing an example of how MAC addresses are assigned to the subscriber apparatus, subscriber multiplexing/demultiplexing apparatus, and access gateway shown in FIGS. 2 and 3.
Figure 8:
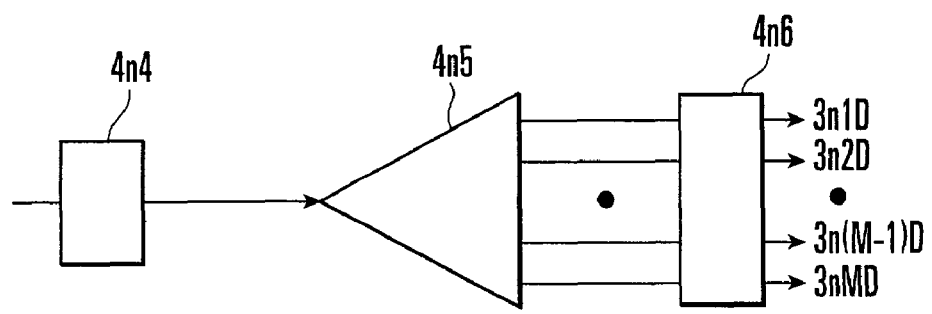
FIG. 8 is a block diagram schematically showing the functions of the Ethernet/IEEE 802.3 interface block, demultiplexing block, and ADSL/VDSL interface block shown in FIG. 2.
Figure 9:
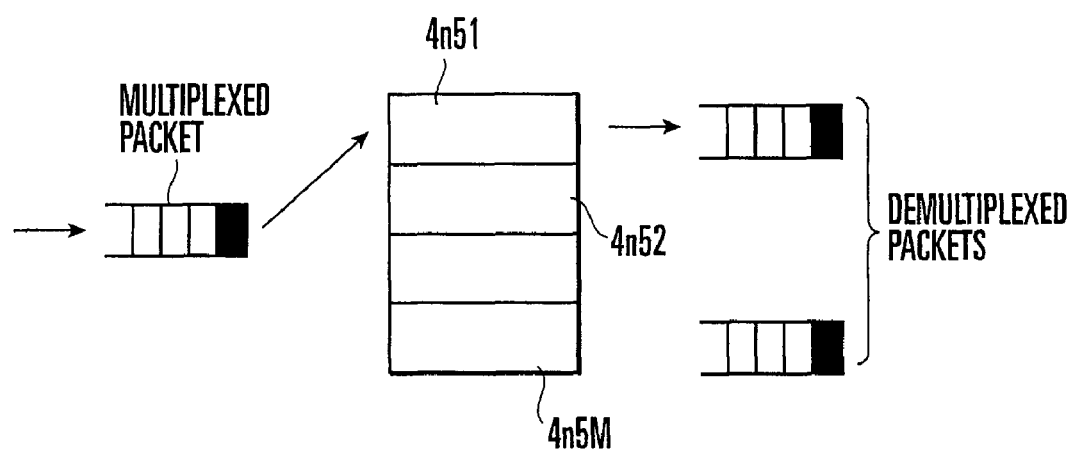
FIG. 9 is a view showing the process of downward multiplexing in the subscriber multiplexing/demultiplexing apparatus.
Figure 10:
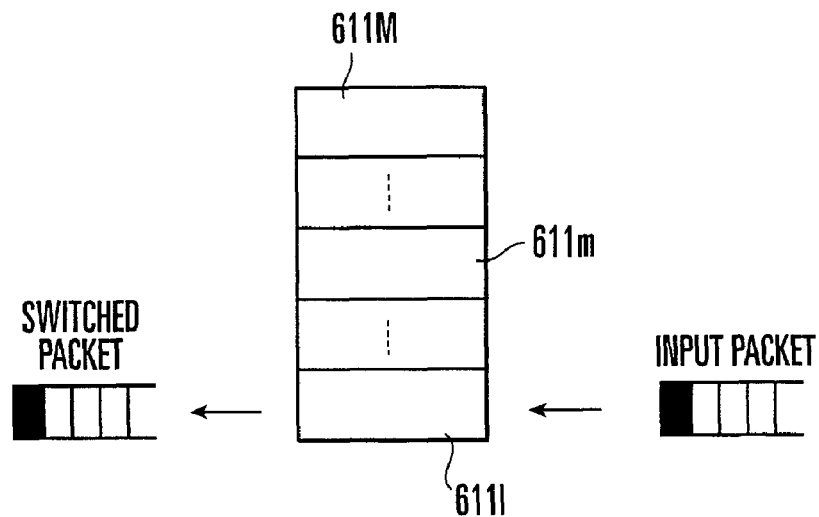
FIG. 10 is a schematic view showing how queue write and queue read in the upward direction are performed in the packet switch module shown in FIGS. 2 and 3.

As shown in FIG. 4, as the MAC address (DST MAC Address/SRC MAC Address) to be added to the Ethernet/IEEE 802.3 frame output from the subscriber apparatus 2nm to the subscriber multiplexing/demultiplexing apparatus 4n, 2011/1021 is used. 2011 is a destination identification address for identifying the input port of the subscriber multiplexing/demultiplexing apparatus 4n, and 1021 is a source identification address for identifying the subscriber apparatus 2nm.

Since each port (ADSL/VDSL interface 3nmU) directed from the subscriber multiplexing/demultiplexing apparatus 4n to a corresponding one of subscriber apparatuses 2nm is connected to the subscriber apparatus 2nm in a one-to-one correspondence with each other, either 2011 or 1021 may be used as a MAC address. Since a subscriber is specified in the subscriber multiplexing/demultiplexing apparatus 4n, either of these addresses can be selectively used as a MAC address in the subscriber multiplexing/demultiplexing apparatus 4n.

The subscriber multiplexing/demultiplexing apparatuses 4n is comprised of an ADSL/VDSL interface block 4n1, multiplexing block 4n2, Ethernet/IEEE 802.3 interface block 4n3, Ethernet/IEEE 802.3 interface block 4n4, demultiplexing block 4n5, and ADSL/VDSL interface 4n6. In this case, the "ADSL/VDSL interface block" indicates that either an ADSL interface block or an VDSL interface block is used depending on whether an ADSL interface or a VDSL interface is used as an interface between the subscriber apparatus 2nm and the subscriber multiplexing/demultiplexing apparatuses 4n. In this case, the "Ethernet/IEEE 802.3 interface block" indicates that either an Ethernet interface block or an IEEE 802.3 interface block is used depending on whether an Ethernet interface or an IEEE 802.3 interface is used as an interface between the subscriber multiplexing/demultiplexing apparatuses 4n and the access gateway 61.

The access gateway 61 is comprised of an Ethernet/IEEE 802.3 interface block 6nU, packet switch module 611, POS OC-12C interface block 612, POS OC-12C interface block 613, CPU board 614A, and Ethernet/IEEE 802.3 interface block 6nD. In this case, the "Ethernet/IEEE 802.3 interface block" indicates that either an Ethernet interface block or an IEEE 802.3 interface block is used depending on whether an Ethernet interface or an IEEE 802.3 interface is used as an interface between the subscriber multiplexing/demultiplexing apparatuses 4n and the access gateway 61.

The constituent elements of the subscriber multiplexing/demultiplexing apparatuses 4n will be described in detail first.

The ADSL/VDSL interface block 4n1 is provided for each subscriber and executes an interface function with respect to an ADSL/VDSL signal input from the subscriber apparatus 2nm for a corresponding subscriber. That is, the ADSL/VDSL interface block 4n1 extracts an Ethernet/IEEE 802.3 frame packet and the MAC address added to the packet from a received ADSL/VDSL signal, and transfers the extracted Ethernet/IEEE 802.3 frame packet and MAC address to the multiplexing block 4n2.

The multiplexing block 4n2 multiplexes the Ethernet/IEEE 802.3 frame packets input from the respective ADSL/VDSL interface blocks 4n1 by using a plurality of FIFOs. This multiplexing is performed on the basis of input MAC addresses.

The Ethernet/IEEE 802.3 interface block 4n3 executes an interface function between the subscriber multiplexing/demultiplexing apparatuses 4n and the access gateway 61. That is, the Ethernet/IEEE 802.3 interface block 4n3 converts a multiplexed Ethernet/IEEE 802.3 frame packet into an Ethernet/IEEE 802.3 signal and outputs it onto an Ethernet/IEEE 802.3 interface block 5nU.

The Ethernet/IEEE 802.3 interface block 4n4 executes an interface function between the access gateway 61 and the subscriber multiplexing/demultiplexing apparatuses 4n. That is, the Ethernet/IEEE 802.3 interface block 4n4 receives the Ethernet/IEEE 802.3 signal output from the Ethernet/IEEE 802.3 interface block 6nD of the access gateway 61, extracts an Ethernet/IEEE 802.3 frame packet and MAC address, and transfers the extracted Ethernet/IEEE 802.3 frame packet and MAC address to the demultiplexing block 4n5.

The demultiplexing block 4n5 demultiplexes the Ethernet/IEEE 802.3 frame packet transferred from the Ethernet/IEEE 802.3 interface block 4n4 by using a plurality of FIFOs. This demultiplexing is performed on the basis of an input MAC address.

The ADSL/VDSL interface 4n6 is provided for each subscriber apparatus 2nm and executes an interface function with respect to each Ethernet/IEEE 802.3 frame packet demultiplexed by the demultiplexing block 4n5 for a corresponding subscriber. That is, the ADSL/VDSL interface 4n6 converts each demultiplexed Ethernet/IEEE 802.3 frame packet into an ADSL/VDSL signal and transfers it to a corresponding subscriber apparatus.

The respective constituent elements of the access gateway 61 will be described in detail next.

The Ethernet/IEEE 802.3 interface block 6nU executes an interface function with respect to the Ethernet/IEEE 802.3 signal (the signal carrying an Ethernet/IEEE 802.3 frame packet) input from the subscriber multiplexing/demultiplexing apparatuses 4n through the Ethernet/IEEE 802.3 interface block 5nU. That is, the Ethernet/IEEE 802.3 interface block 6nU receives an Ethernet/IEEE 802.3 signal, extracts an Ethernet/IEEE 802.3 frame packet and an MAC address contained in the packet, and transfers the extracted Ethernet/IEEE 802.3 frame packet and the MAC address in the packet to the packet switch module 611.

The Ethernet/IEEE 802.3 interface block 6nU refers to the value indicated by the protocol field of a PPP packet in an extracted Ethernet/IEEE 802.3 frame packet and perform the first discrimination, i.e., discriminating the PPP packet extracted from the Ethernet/IEEE 802.3 signal as a PPP data packet if the value is "0021", and the second discrimination, i.e., discriminating the PPP packet extracted from the Ethernet/IEEE 802.3 signal as a PPP control packet if the value is "8021" or "c021". The Ethernet/IEEE 802.3 interface block 6nU then supplies the discrimination result to the packet switch module 611.

The packet switch module 611 performs switching with respect to Ethernet/IEEE 802.3 frame packets on the basis of the MAC addresses and discrimination results transferred from the Ethernet/IEEE 802.3 interface block 6nU, and also performs switching with respect to PPP packets on the basis of the IP addresses transferred from the POS OC-12C interface block 613.

The POS OC-12C interface block 612 executes an interface function between the access gateway 61 and the backbone network 81. If the PPP packet in the Ethernet/IEEE 802.3 frame packet input to the packet switch module 611 is a PPP data packet, i.e., the discrimination result is the first discrimination, the PPP packet (FIG. 17A) is output through the POS OC-12C interface block 612. In this case, the PPP packet is subjected to PPP termination processing, and the PPP packet having undergone the PPP termination processing is converted into a PPP packet in PPP packet (FIG. 17B shows its frame). The PPP packet in PPP packet is electrooptically converted into a POS signal (POS OC-12c signal) in the SDH/SONET frame form shown in FIG. 18. This signal is then transmitted to the backbone network 81 through the POS OC-12C interface 71.

The POS OC-12C interface block 613 executes an interface function with respect to the POS signal received from the backbone network 81 through the POS OC-12C interface 71. That is, the POS OC-12C interface block 613 performs PPP termination processing (PPP termination processing between the backbone network 81 and the access gateway 61) with respect to a POS signal, i.e., extracts a PPP packet from the POS signal and adds a protocol field to the PPP packet (sets the value of the protocol field to 0021) to form a PPP packet.

With this PPP termination processing, the POS signal is formed into a PPP packet and transferred to the packet switch module 611.

The CPU board 614A performs transfer processing for the PPP control packet shown in FIGS. 22 and 23 under program control on the basis of the second discrimination, and transfers the PPP control packet for necessary PPP processing between the CPU board 614A of the access gateway 61 and the subscriber apparatus 2nm.

The Ethernet/IEEE 802.3 interface block 6nD receives the Ethernet/IEEE 802.3 frame packet or PPP packet switched by the packet switch module 611, and adds the frame header (containing a MAC address) of the Ethernet/IEEE 802.3 frame. The Ethernet/IEEE 802.3 interface block 6nD then converts the Ethernet/IEEE 802.3 frame packet into an Ethernet/IEEE 802.3 signal, and outputs it onto an Ethernet/IEEE 802.3 interface 5nD.

The MAC address to be added includes a source identification address (SRC MAC Address) (the identification address of an identification section through which a communication signal passes in the multiplex system) at which a signal is output from the access gateway 61, and a destination identification address (DSC MAC Address) (the identification address of a signal identification section through which a communication signal passes in the multiplex system) at which a signal is input to the subscriber multiplexing/demultiplexing apparatuses 4n. As a source identification address and destination identification address, the addresses of apparatuses from/to which signals are output/input or the addresses of the ports of apparatuses from/to which signals are output/input are used.

An example of how a MAC address is added in the Ethernet/IEEE 802.3 interface block 6nD will be described below with reference to FIG. 4.

As shown in FIG. 4, as the MAC address (DST MAC Address/SRC MAC Address) to be added to the Ethernet/IEEE 802.3 frame output from the access gateway 61 to the subscriber multiplexing/demultiplexing apparatuses 4n, 2011/3011 is added. 2011 is the address of an output port directed from the subscriber multiplexing/demultiplexing apparatuses 4n to the subscriber apparatus 2nm, and 3011 is the address of the output port of the access gateway 61 directed from the access gateway 61 to the subscriber multiplexing/demultiplexing apparatuses 4n as a destination.

The operation of this embodiment will be described next with reference to FIGS. 1 to 14.

Transmission of an IP packet from the subscriber (personal computer 1nml) side to the backbone network 81 side will be described first.

When the personal computer 1nml tries to access the Internet, the computer transmits an IP packet to the subscriber apparatus 2nm.

Upon reception of this IP packet, the subscriber apparatus 2nm adds a PPP header to the received IP packet (IP and PPP of ATUU-R in FIG. 5), and then adds the frame header of an Ethernet/IEEE 802.3 frame (FIG. 12) (MAC of ATUU-R in FIG. 5). The subscriber apparatus 2nm performs analog modulation with respect to the Ethernet/IEEE 802.3 frame packet to which the frame header of the Ethernet/IEEE 802.3 frame is added to convert it into a 100-kb/s ADSL/VDSL signal, and transmits it to the subscriber multiplexing/demultiplexing apparatuses 4n.

The ADSL/VDSL signal transmitted from the subscriber apparatus 2nm through the ADSL/VDSL interface 3nmU is received by the corresponding ADSL/VDSL interface block 4n1 of the subscriber multiplexing/demultiplexing apparatuses 4n. The ADSL/VDSL interface block 4n1 extracts an Ethernet/IEEE 802.3 frame packet and an MAC address in the packet from the ADSL/VDSL signal. The extracted Ethernet/IEEE 802.3 frame packet is written in a corresponding FIFO of the FIFOs equal in number to subscriber lines (the number of ADSL/VDSL interfaces $3nmU$)(M) constituting the multiplexing block $4n2$ on the basis of the extracted MAC (the MAC of the DSLAM in FIG. 5).

The Ethernet/IEEE 802.3 frame packet transmitted over an ADSL/VDSL signal on each ADSL/VDSL interface $3nmU$ is written in a FIFO of the M FIFOs of the multiplexing block $4n2$ which corresponds to the input Ethernet/IEEE 802.3 frame packet upon referring to the byte count of the IP packet indicated by the byte count field (length field) (the field located between the third and fourth bytes of the IP packet) in the PPP packet contained in the packet.

Packets are multiplexed by writing Ethernet/IEEE 802.3 frame packets in the M FIFOs and reading out Ethernet/IEEE 802.3 frame packets from the first FIFO to the Nth FIFO of the M FIFOs in the order named.

An example of multiplexing will be described below.

For example, as shown in FIG. 4, the Ethernet/IEEE 802.3 frame packet ($2nm$ in FIGS. 6 and 7) in the ADSL/VDSL signal transmitted from the subscriber apparatus $2nm$ through the ADSL/VDSL interface $3nmU$ having a throughput of about several 100 kb/s has 1021 as the source identification address of a MAC address, and 2011 as a destination identification address (1021 is the address of the subscriber apparatus $2nm$, and 2011 is the address of the corresponding input port of the subscriber multiplexing/demultiplexing apparatuses $4n$). This Ethernet/IEEE 802.3 frame packet is designated by a source identification address and input to a FIFO $4n2m$ (FIG. 7) storing a packet queue to be written therein.

Write operation similar to this write operation is also performed for the respective Ethernet/IEEE 802.3 frame packets input from other subscriber apparatuses $2n1, 2n2, \ldots, 2n(m-1), 2n(m+1), 2n(m+2), \ldots, 2nM$. The FIFOs used for the respective Ethernet/IEEE 802.3 frame packets are a FIFO $4n21$, FIFO $4n22, \ldots$, FIFO $4n2(m-1)$, FIFO $4n2(m+1)$, FIFO $4n2(m+2)$, and FIFO $4n2M$.

After this write operation, read operation is performed with respect to the FIFO $4n21$, FIFO $4n22, \ldots$, FIFO $4n2M$ in the order named.

With the above write and read operations, Ethernet/IEEE 802.3 frame packets are multiplexed. In this case, the Ethernet/IEEE 802.3 frame packet to which the address of the corresponding input port of the subscriber multiplexing/demultiplexing apparatuses $4n$ or the address of the subscriber apparatus $2nm$ is added as a MAC address for identifying the subscriber is read out from the subscriber multiplexing/demultiplexing apparatuses $4n$ at a throughput of 10 Mb/s and multiplexed. The multiplexed Ethernet/IEEE 802.3 signal is then transmitted from the Ethernet/IEEE 802.3 interface block $4n3$ to the access gateway 61 through the Ethernet/IEEE 802.3 interface block $5nU$.

At the access gateway 61, the Ethernet/IEEE 802.3 frame packet and its MAC address which are transmitted over an Ethernet/IEEE 802.3 signal in the Ethernet/IEEE 802.3 frame form are extracted. In addition, the Ethernet/IEEE 802.3 interface block $6nU$ discriminates a PPP packet in the packet is a PPP control packet or a PPP data packet.

This discrimination is performed on the basis of the value of a protocol field (FIG. 21) of the input PPP packet.

Figure 2:
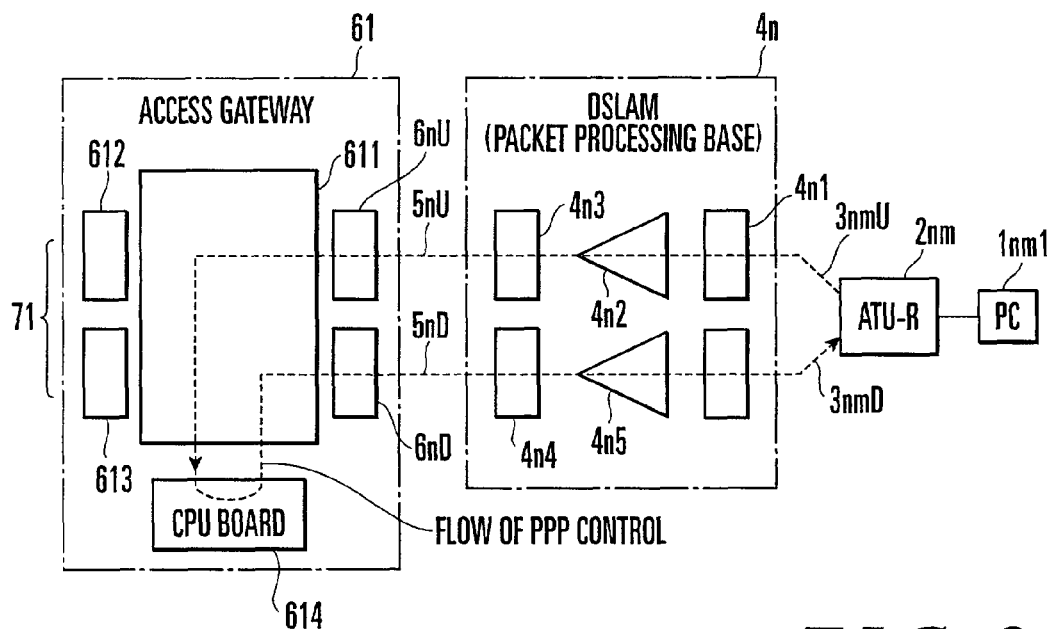
FIG. 2 is a block diagram showing the flow of a PPP control packet in the detailed arrangement of the access network system.
Figure 3:
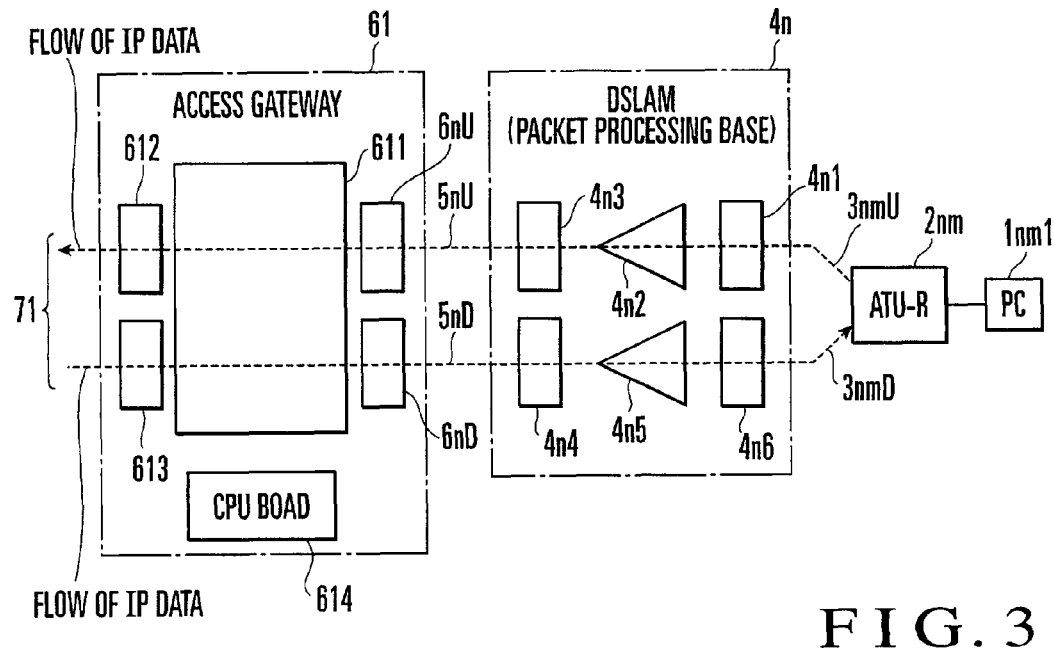
FIG. 3 is a block diagram showing the flow of a PPP data packet in the detailed arrangement of the access network system.

If the input PPP packet is a PPP control packet, i.e., the value of the protocol field of the input PPP packet is c021 or 8021, the Ethernet/IEEE 802.3 frame packet is stored as one of queues 6111 to 611M (FIG. 10) in a memory (not shown) in the packet switch module 611 for each subscriber apparatus on the basis of the MAC address. Thereafter, the PPP control packet of the Ethernet/IEEE 802.3 frame is transferred to the CPU board 614A. That is, the packet is switched by the packet switch module 611 (MAC of AG in FIG. 15), and a CPU board 614 transfers a PPP control packet for PPP processing required between the CPU board 614 and the subscriber apparatus $2nm$, as shown in FIG. 2, thereby performing the processing shown in FIGS. 22 and 23. This processing itself is known link establishment processing.

This operation will be briefly described below.

When a PPP control packet is transferred between the CPU board 614 and the subscriber apparatus $2nm$, the control information of the PPP control packet is exchanged between them. With this operation, a series of operations, e.g., authentication, accounting, band allocation, and minimum delay processing (assurance of Qos), is complete at the access gateway 61.

At the access gateway 61, in performing PPP processing for each subscriber, as a PPP control packet to the transferred, an LCP packet is transferred first, and then an NCP packet is transferred (FIG. 23). With this operation, PPP processing is performed.

When a link is established between the personal computer $1nml$ and the access gateway 61 in this manner, IP data is output from the personal computer $1nml$. The output IP data is formed into an Ethernet/IEEE 802.3 frame packet and transmitted to the access gateway 61 through the subscriber apparatus $2nm$ and subscriber multiplexing/demultiplexing apparatuses $4n$ in the above manner.

Whether the PPP packet in this Ethernet/IEEE 802.3 frame packet is a PPP data packet or not is determined depending on whether the value of the protocol field of the input PPP packet indicates 0021 or not (FIG. 21). In this case as well, the PPP data packet is stored as one of the queues 6111 to 611M (FIG. 10) in the memory (not shown) in the packet switch module 611 on the basis of the MAC address. Thereafter, the PPP header added by the subscriber apparatus $2nm$ for PPP processing required between the subscriber apparatus $2nm$, which has transmitted the PPP data packet, and the access gateway 61 is removed from each PPP data packet by the POS OC-12C interface block 612. A new PPP header for POS is added to the PPP packet from which the PPP head has been removed.

The frame (FIG. 17B) to which the new PPP header is added is transmitted over a 620-Mb/s POS signal (FIG. 18) (POS OC-12c signal) in the SDH/SONET frame form from the POS OC-12C interface block 612 to the backbone network 81 through the POS OC-12C interface 71.

Transmission of an IP packet from the backbone network 81 side to the subscriber (personal computer $1nml$) side will be described next.

In transferring an IP packet downward from the backbone network 81, a 620-Mb/s POS signal (FIG. 18) in the SDH/SONET frame form, which carries a packet (FIG. 17B) of a PPP packet in PPP packet frame containing the PPP packet obtained by performing PPP header addition processing (PPP Encapsulation) (mapping) with respect to the IP packet in the backbone network 81, is transmitted to the access gateway 61 through the POS OC-12C interface 71.

In the POS OC-12C interface block 613 which receives the packet of the PPP packet in PPP packet frame carried on the POS signal, PPP processing between the backbone network and the AG is performed. In the PPP processing between the backbone network and the AG, for example, a maximum packet length: MTU (Maximum Transfer Unit) size of packets to be exchanged between the backbone network and the AG is determined. In the PPP processing, the PPP header of the PPP packet in the packet of the PPP packet in PPP packet frame is removed.

After the PPP processing between the backbone network and the AG, 0021 is added as the value of a protocol field for PPP processing for transfer to a subscriber to the PPP packet, and the PPP packet and the IP address of the PPP packet are output from the POS OC-12C interface block 613 to the packet switch module 611.

Figure 11:
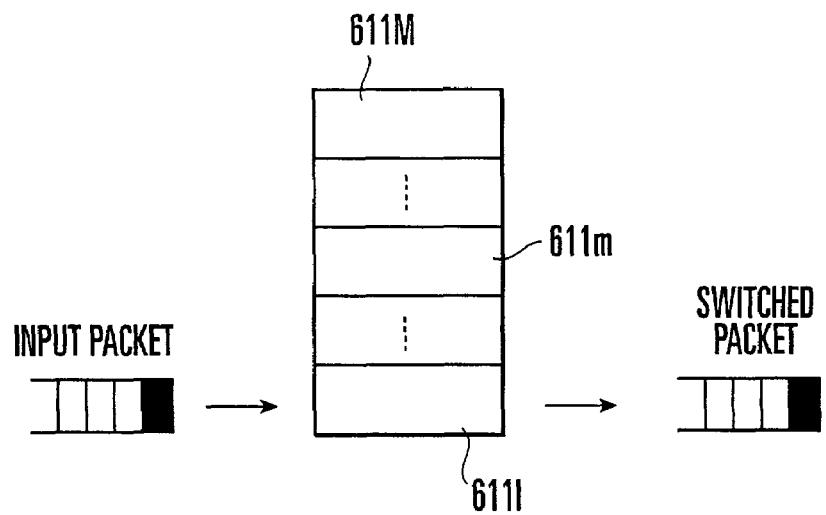
FIG. 11 is a schematic view showing how queue write and queue read in the downward direction are performed in the packet switch module shown in FIGS. 2 and 3.
Figure 12A:
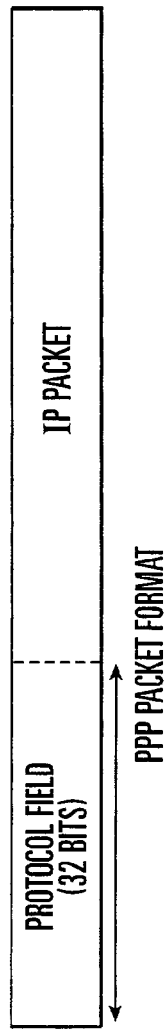
FIGS. 12A and 12B are views respectively showing the format of a PPP packet and the format of an Ethernet/IEEE 802.3 frame.
Figure 12B:
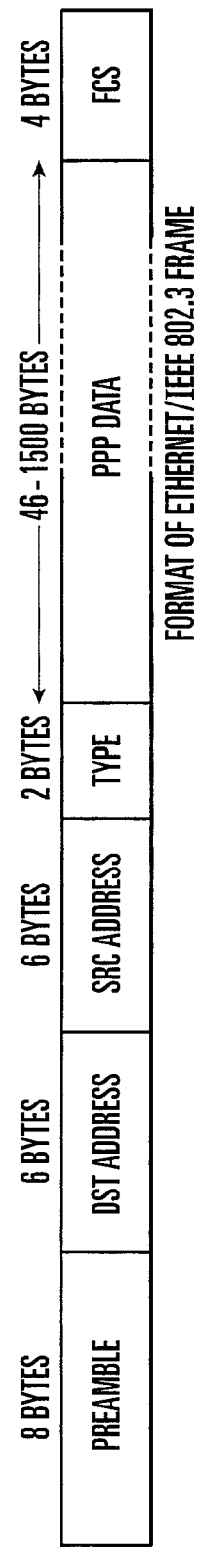

Any PPP packet transferred to the packet switch module 611 is written in the form of a queue in the memory on a subscriber basis on the basis of the IP address (FIG. 11). The written queues 6111 to 611M are respectively assigned priorities. For example, referring to FIG. 11, the highest priority is assigned to the queue 611m to be sent to the subscriber apparatus 2nm, and lower priorities are assigned to the remaining queues 6111, 6112, . . . , 611n(m−1), 611(m+1), 611(m+2), . . . , 611M.

The queue 611m to which the highest priority is assigned, therefore, is performed preferentially as compared with the PPP packets in the remaining queues. For this reason, a delay of the PPP packet written in the queue 611m is output to the Ethernet/IEEE 802.3 interface block 6nD after a lapse of a minimum delay time.

In transmission of such a PPP packet, if a band to be secured is 6 Mb/s, traffic shaping (packet fragmentation) is performed to set the maximum band to 6 Mb/s.

In the packet switch module 611, packet switching of the PPP packet is performed, and the packet is transferred from the packet switch module 611 to the Ethernet/IEEE 802.3 interface block 6nD.

The Ethernet/IEEE 802.3 interface block 6nD adds the MAC address of each subscriber (MAC of AG in FIG. 5) to the packet to convert it into an Ethernet/IEEE 802.3 signal in the Ethernet/IEEE 802.3 frame form. This signal is transmitted to the subscriber multiplexing/demultiplexing apparatuses 4n.

The Ethernet/IEEE 802.3 signal is received by the Ethernet/IEEE 802.3 interface block 4n4 of the subscriber multiplexing/demultiplexing apparatuses 4n. The Ethernet/IEEE 802.3 interface block 4n4 outputs an Ethernet/IEEE 802.3 frame packet and its MAC address from the Ethernet/IEEE 802.3 signal.

The Ethernet/IEEE 802.3 frame packet and MAC address output from the Ethernet/IEEE 802.3 interface block 4n4 are supplied to the demultiplexing block 4n5. In a plurality of FIFOs of the demultiplexing block 4n5, the Ethernet/IEEE 802.3 frame packet is demultiplexed on the basis of the MAC address (MAC of DSLAM in FIG. 5). For this demultiplexing, for example, the Ethernet/IEEE 802.3 frame packet to be transmitted to the subscriber apparatus 2nm is written in a corresponding FIFO 4n5m.

Each of these FIFOs 4n51 to 4n5M has a storage capacity large enough to satisfy QoS in association with the throughput of the ADSL/VDSL interface 3nmU and the write and read speeds of each FIFO. Even if the packet length increases to exceed the storage capacity of each FIFO, since the packet is transmitted upon fragmentation by traffic shaping in the access gateway 61, no FIFO overflows.

Each of the packets stored in the queue form in the FIFOs is read out from each FIFO, and the signal is converted into a VDSL/ADSL signal carrying the Ethernet/IEEE 802.3 frame packet in the ADSL/VDSL interface 4n6. This VDSL/ADSL signal is then transmitted to the subscriber apparatus 2nm. The subscriber apparatus 2nm reconstructs the IP packet (MAC of ATUU-R in FIG. 5) by removing the frame header of the Ethernet/IEEE 802.3 frame and the PPP header as header information in the received VDSL/ADSL signal. This IP packet is transmitted from the subscriber apparatus 2nm to the personal computer 1nml.

As described above, according to the arrangement of this example, the subscriber multiplexing/demultiplexing apparatuses 4n can multiplex Ethernet/IEEE 802.3 frame packets from the respective subscriber apparatuses 2nm on the basis of the MAC addresses, output the resultant signal as an Ethernet/IEEE 802.3 signal, and output each Ethernet/IEEE 802.3 frame packet in the Ethernet/IEEE 802.3 signal. The subscriber multiplexing/demultiplexing apparatuses 4n can also demultiplex an Ethernet/IEEE 802.3 frame packet from the access gateway 61 on the basis of the MAC address.

In addition, processing in each subscriber apparatus 2nm, each subscriber multiplexing/demultiplexing apparatuses 4n, and access gateway 61 can be performed by using MAC addresses, and the AAL5 layer required in the prior art is not required. This makes it possible to eliminate the necessity of an ATM switch in the prior art and simplify the system arrangement.

Under this system simplification, QoS of each subscriber can be ensured.

Second Embodiment

Figure 15:
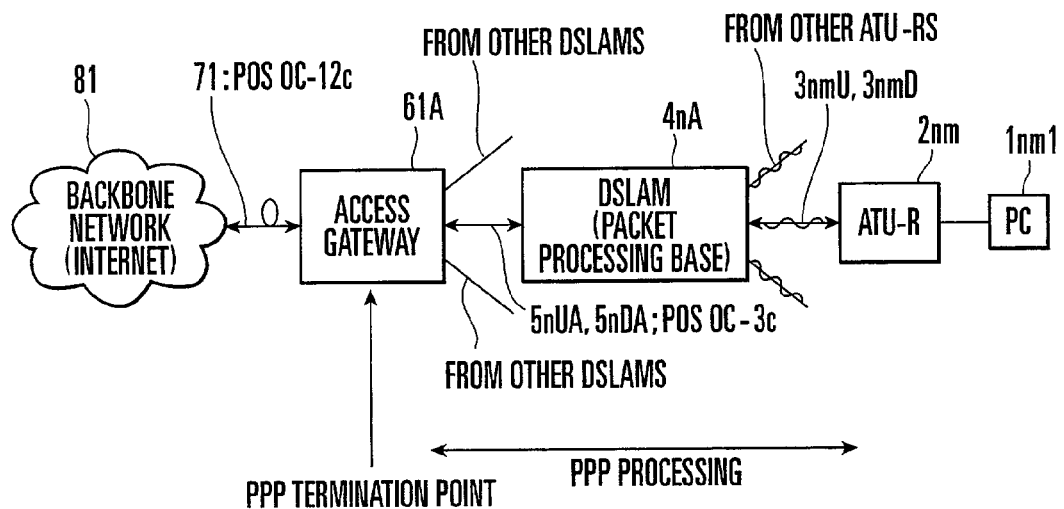
FIG. 15 is a block diagram showing the electrooptical arrangement of an access network system according to the second embodiment of the present invention.
Figure 16:
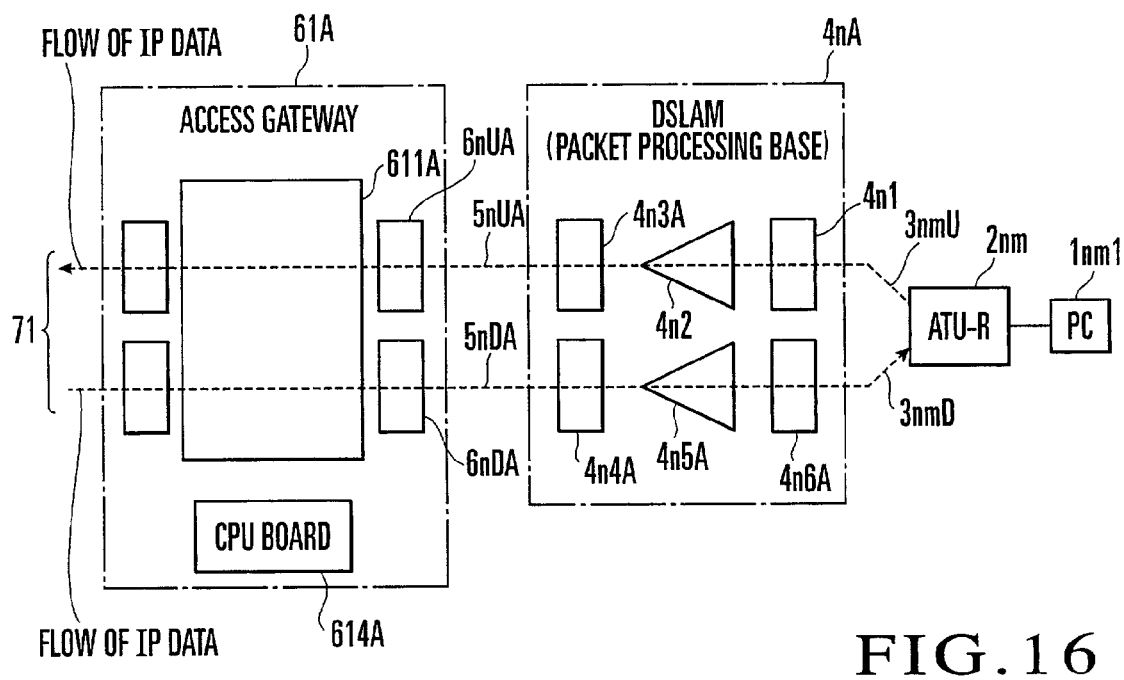
FIG. 16 is a block diagram showing the detailed arrangement of the access network system.
Figure 17:
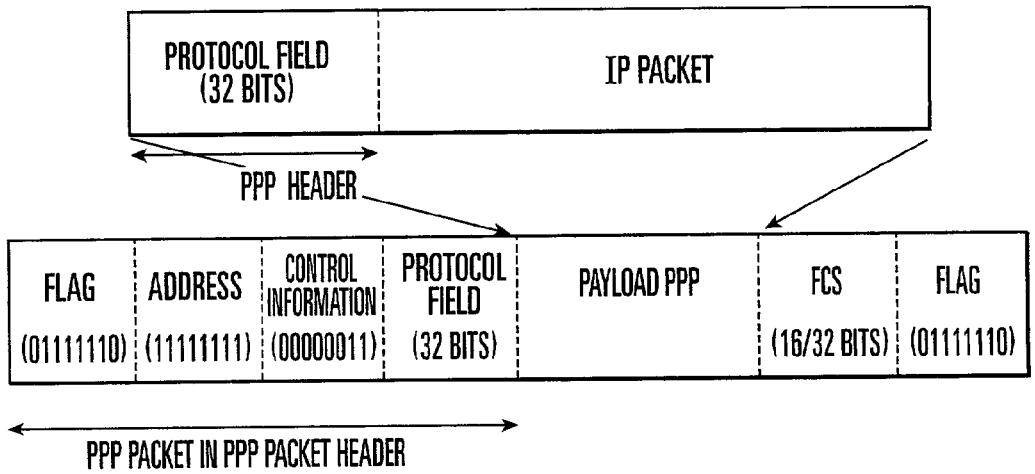
FIGS. 17A and 17B are views respectively showing the format of a PPP packet and the format of a PPP packet in PPP packet.
Figure 18:
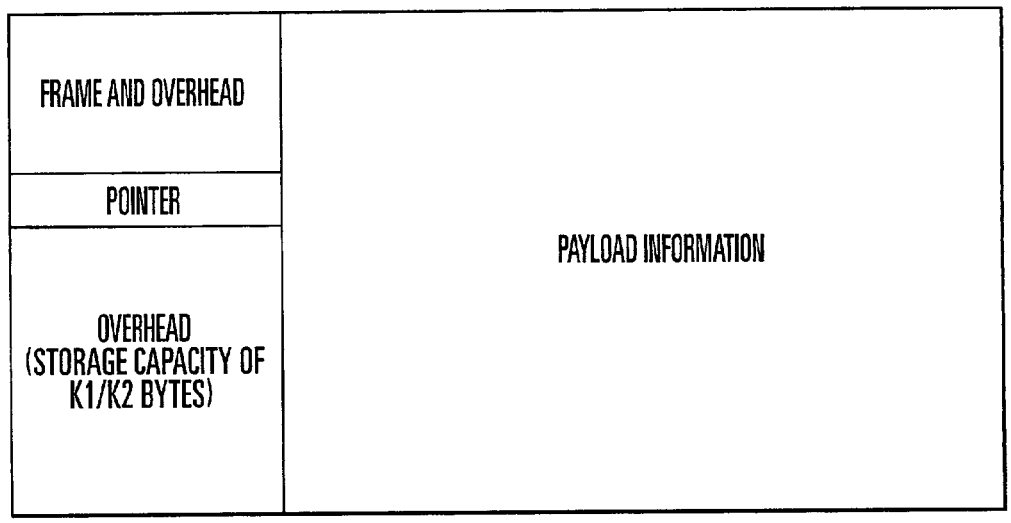
FIG. 18 is a view showing the format of an SDH/SONET frame.
Figures 19, 20:
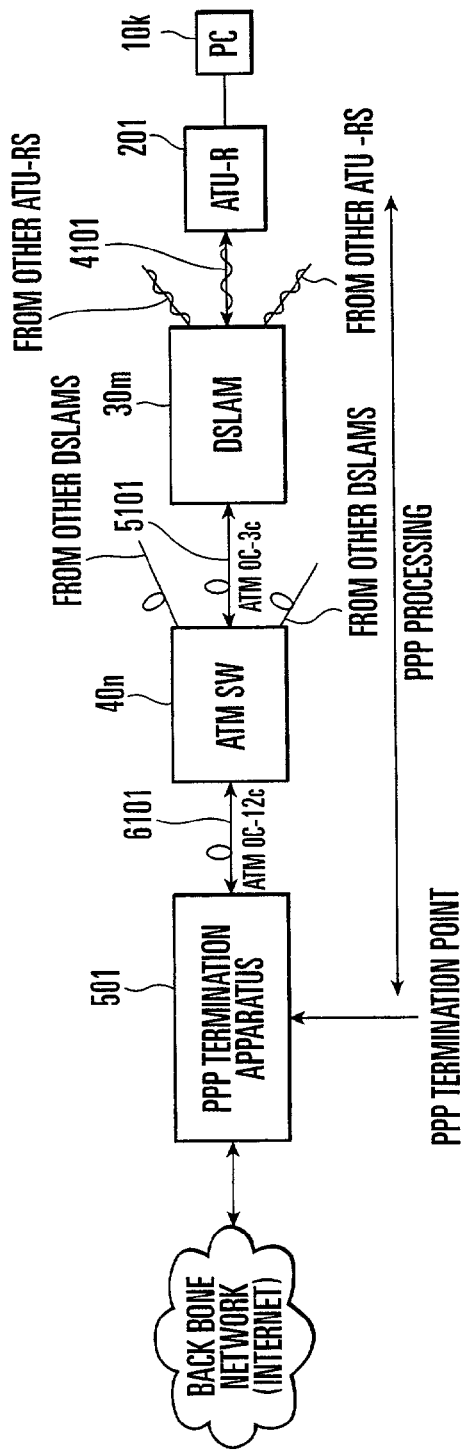
FIG. 19 is a block diagram showing the electrical arrangement of a conventional access network system.
FIG. 20 is a view showing a conventional protocol stack.

FIG. 15 shows the electrooptical arrangement of an access network system according to the second embodiment of the present invention. FIG. 16 shows the detailed arrangement of the access network system. FIG. 17 shows the format of a PPP packet and the format of a PPP packet in PPP packet. FIG. 18 shows the format of an SDH/SONET frame.

The arrangement of this embodiment greatly differs from that of the first embodiment in that the subscriber multiplexing/demultiplexing apparatus and access gateway in the first embodiment are connected to each other through a POS OC-3c interface, and the subscriber multiplexing/demultiplexing apparatus and access gateway are changed in accordance with this change in arrangement.

More specifically, an access network system 10A is a system for performing PPP processing equivalent to the PPP processing performed by using the MAC layer in the first embodiment and is roughly comprised of a subscriber apparatus 2nm, subscriber multiplexing/demultiplexing apparatus 4nA, and access gateway 61A.

The subscriber multiplexing/demultiplexing apparatus 4nA is connected to the access gateway 61A through a POS OC-3c interface 5nAU and POS OC-3c interface 5nAD.

The subscriber multiplexing/demultiplexing apparatus 4An is comprised of an ADSL/VDSL interface block 4n1, multiplexing block 4n2, POS OC-3c interface block 4n3A, POS OC-3c interface block 4n4A, demultiplexing block 4n5A, and ADSL/VDSL interface block 4n6A. "OC-3c" of the POS OC-3c interface block 4n3A and POS OC-3c interface block 4n4A is a notation representing a communication speed, which is 155 Mb/s.

The access gateway 61A includes a POS OC-3c interface block 6nUA, packet switch module 611A, POS OC-12c interface block 612, POS OC-12c interface block 613, CPU board 614A, and POS OC-3c interface block 6nDA.

The constituent elements of the subscriber multiplexing/demultiplexing apparatus 4An will be described in detail first.

The POS OC-3c interface block 4n3A executes an interface function between the subscriber multiplexing/demultiplexing apparatus 4An and the access gateway 61A. More specifically, the POS OC-3c interface block 4n3A converts a PPP packet in a multiplexed POS OC-3c frame packet into a POS signal (POS OC-3c signal) in the SDH/SONET frame form containing a packet of a PPP packet in PPP packet frame, and outputs it onto the POS OC-3c interface 5nAU.

The POS OC-3c interface block 4n4A executes an interface function between the access gateway 61A and the subscriber multiplexing/demultiplexing apparatus 4An. More specifically, the POS OC-3c interface block 4n4A receives the POS signal output from the POS OC-3c interface block 6nDA of the access gateway 61A, extracts a PPP packet and IP address in each PPP packet in PPP packet, and transfers the PPP packet in the PPP packet in PPP packet and the IP address in the PPP packet to the demultiplexing block 4n5A.

The demultiplexing block 4n5A demultiplexes the PPP packet transferred from the POS OC-3c interface block 4n4A by using a plurality of FIFOs. This demultiplexing is performed on the basis of the input IP address.

The ADSL/VDSL interface block 4n6A is provided for each subscriber apparatus 2nm, and executes an interface function for each PPP packet demultiplexed by the demultiplexing block 4n5A. More specifically, the ADSL/VDSL interface block 4n6A converts each demultiplexed PPP packet into an ADSL/VDSL signal in the Ethernet/IEEE 802.3 frame form, and transfers the ADSL/VDSL signal to a corresponding subscriber apparatus.

The respective constituent elements of the access gateway 61A will be described next.

The POS OC-3c interface block 6nUA executes an interface function for the POS signal input from the subscriber multiplexing/demultiplexing apparatus 4An through the POS OC-3c interface 5nAU. More specifically, the POS OC-3c interface block 6nUA receives a POS signal, extracts a PPP packet in a PPP packet in PPP packet and an IP address in the PPP packet, and transfers the extracted PPP packet and the IP address in the PPP packet to the packet switch module 611A.

The POS OC-3c interface block 6nUA refers to the value indicated by the protocol field of the extracted PPP packet and performs the first discrimination, i.e., discriminating the extracted PPP packet as a PPP data packet if the value is "0021", and the second discrimination, i.e., discriminating the extracted PPP packet as a PPP control packet if the value is "8021" or "c021". The POS OC-3c interface block 6nUA then supplies the discrimination result to the packet switch module 611A.

The packet switch module 611A performs switching with respect to PPP packets on the basis of the IP addresses and discrimination results transferred from the POS OC-3c interface block 6nUA, and also performs switching with respect to PPP packets on the basis of the IP addresses transferred from the POS OC-12c interface block 613.

The CPU board 614A performs transfer processing of a PPP control packet for the first PPP processing required between the CPU board 614A of the access gateway 61A and the subscriber apparatus 2nm, and transfer processing of a PPP control packet for the second PPP processing required between the CPU board 614A of the access gateway 61A and the subscriber multiplexing/demultiplexing apparatus 4nA under program control (FIGS. 22 and 23).

The contents of the first PPP processing described are the same as those of the PPP processing executed between the CPU board 614 of the access gateway 61 and the subscriber apparatus 2nm in the first embodiment.

The contents of the second PPP processing are the same as those of the PPP processing executed between the backbone network 81 and the access gateway 61 in the first embodiment. In this processing, for example, a maximum packet length: MTU (Maximum Transfer Unit) size of packets to be exchanged between the access gateway and the subscriber multiplexing/demultiplexing apparatus is determined.

The POS OC-3c interface block 6nDA receives the PPP packet switched by the packet switch module 611A, reassembles it into a PPP packet in PPP packet, converts it into a POS signal in the SDH/SONET form, and outputs it onto the POS OC-3c interface 5nAD.

The CPU board 614A of the access gateway 61A and the subscriber apparatus 2nm are configured as a whole to perform the first PPP processing.

The CPU board 614A of the access gateway 61A and the subscriber multiplexing/demultiplexing apparatus 4nA are configured as a whole to perform the second PPP processing.

The arrangements of the respective sections in the second embodiment are the same as those in first embodiment except for these arrangements. For this reason, the same reference numerals as in the first embodiment denote the same parts in the second embodiment, and a description thereof will be omitted.

The operation of this embodiment will be described next with reference to FIGS. 15 to 18.

The operation of this embodiment is the same as that of the first embodiment except for the following point.

The PPP packet in each Ethernet/IEEE 802.3 frame packet multiplexed by the multiplexing block 4n2 of the subscriber multiplexing/demultiplexing apparatus 4nA is formed into a PPP packet in PPP packet (FIG. 17B) in the POS OC-3c interface block 4n3A. This packet is then converted into a POS signal (POS OC-3c signal) in the SDH/SONET frame form and transmitted onto the POS OC-3c interface 5nAU.

Upon reception of the POS signal through the POS OC-3c interface 5nAU, the POS OC-3c interface block 6nUA extracts a PPP packet and IP address from the PPP packet in PPP packet.

The POS OC-3c interface block 6nUA also checks the contents of a protocol field in the extracted PPP packet to discriminate whether the PPP packet is a PPP data packet or PPP control packet. The POS OC-3c interface block 6nUA then transfers the PPP packet, IP address, and discrimination result to the packet switch module 611A.

The discrimination result includes the first discrimination result indicating that the PPP packet is a PPP data packet, and the second discrimination result indicating that the PPP packet is a PPP control packet.

Upon reception of the PPP packet, IP address, and first discrimination result, the packet switch module 611A switches the PPP packet to the POS OC-12c interface block 613 in accordance with the IP address as in the first embodiment. The POS OC-12c interface block 613 then transmits the POS signal in the SDH/SONET frame form (FIG. 18) onto the POS OC-12C interface 71.

Upon reception of the PPP packet, IP address, and second discrimination result, the packet switch module 611A switches the PPP packet to the CPU board 614A in accordance with the IP address as in the first embodiment.

The CPU board 614A performs transfer processing of a PPP control packet between the CPU board 614A of the access gateway 61A and the subscriber apparatus 2nm shown in FIGS. 22 and 23, and transfer processing of a PPP control packet between the CPU board 614A of the access gateway 61A and the subscriber multiplexing/demultiplexing apparatus 4nA on the basis of the second discrimination under program control. The CPU board 614A then performs the first PPP processing required between the CPU board 614A of the access gateway 61A and the subscriber apparatus 2nm, and the second PPP processing required between the CPU board 614A of the access gateway 61A and the subscriber multiplexing/demultiplexing apparatus 4nA.

As in the first embodiment, the POS OC-12c interface block 613 extracts a PPP packet in a PPP packet in PPP packet and an IP address in the PPP packet from the POS signal in the SDH/SONET form transmitted from the backbone network 81 through the POS OC-12C interface 71, and transfers them to the packet switch module 611A. The packet switch module 611A then performs switching based on the IP address and transfers the PPP packet to the POS OC-3c interface block 6nDA.

The POS OC-3c interface block 6nDA converts the received PPP packet into a POS signal (POS OC-3c signal) in the SDH/SONET form, and transmits it onto a POS OC-3c interface 5nA.

Upon reception of the POS signal from the POS OC-3c interface 5nA, the POS OC-3c interface block 4n4A extracts a PPP packet and an IP address in the PPP packet from each PPP packet in PPP packet in the POS signal, and transfers them to the demultiplexing block 4n5A.

The demultiplexing block 4n5A demultiplexes each received PPP packet on the basis of the received IP address and transfers the packet to the ADSL/VDSL interface block 4n6A.

The ADSL/VDSL interface block 4n6A converts the PPP packet transferred from the demultiplexing block 4n5A into an ADSL/VDSL signal in the Ethernet/IEEE 802.3 frame form, and transmits the ADSL/VDSL signal to a corresponding subscriber apparatus 4nm.

As described above, according to the arrangement of this embodiment, the subscriber multiplexing/demultiplexing apparatuses 4n can multiplex Ethernet/IEEE 802.3 frame packets from the respective subscriber apparatuses 2nm on the basis of MAC addresses and transmit the resultant packet as a POS signal to the access gateway 61A.

Each PPP packet in the POS signal transmitted from the access gateway 61A can be demultiplexed on the basis of the IP addresses.

In addition, this embodiment is configured such that processing in each subscriber apparatus 2nm and multiplexing in the subscriber multiplexing/demultiplexing apparatus 4nA can be performed by using MAC addresses, and demultiplexing in the access gateway 61A and each subscriber multiplexing/demultiplexing apparatus 4nA can be performed by using IP addresses. This arrangement eliminates the necessity of the AAL5 layer which is required in the prior art. This makes it possible to eliminate the necessity of an ATM switch in the prior art and simplify the system arrangement.

Under this system simplification, QoS of each subscriber can be ensured.

The present invention has been described in detail above with reference to the accompanying drawings. However, the present invention is not limited to these embodiments, and the present invention incorporates a change in design and the like within the scope of the present invention.

For example, the subscriber multiplexing/demultiplexing apparatuses 4n may multiplex the PPP packets in Ethernet/IEEE 802.3 frame packets instead of the packets. With this change, the Ethernet/IEEE 802.3 interface blocks 4n1 and 4n3 need to be changed.

In addition, the subscriber multiplexing/demultiplexing apparatuses 4n and 4nA may perform multiplexing on the basis of the IP addresses of PPP packets.

Furthermore, the present invention can be executed to convert the above packets into other communication signals and multiplex/demultiplex the communication signals.

Multiplexing and demultiplexing in the subscriber multiplexing/demultiplexing apparatuses 4n and 4nA can be executed by systems other than the access network system.

Moreover, the present invention can be executed even if a signal in a frame form other than the SDH/SONET frame form is used as a POS signal.

As has been described above, according to the arrangement of the present invention, a plurality of communication signals can be multiplexed in accordance with identification addresses, and a multiplexed signal obtained by multiplexing a plurality of communication signals can be demultiplexed by using identification addresses.

In addition, PPP packets and the like in a multiplexed signal obtained by multiplexing a plurality of PPP packets used for transmission/reception through the Internet can be demultiplexed by using the IP addresses of the PPP packets.

Furthermore, any process in a plurality of subscriber apparatuses, a plurality of subscriber multiplexing/demultiplexing apparatuses, and access gateway in an access network system can be performed by using MAC addresses or IP addresses. This eliminates the necessity of the AAL5 layer required in the prior art, and hence no ATM switch in the prior art is required. This makes it possible to simplify the system arrangement.

This effect can also be obtained when processing in a plurality of subscriber apparatuses and multiplexing in a plurality of subscriber multiplexing/demultiplexing apparatuses in an access network system can be performed by using MAC addresses, and demultiplexing in an access gateway and a plurality of subscriber multiplexing/demultiplexing apparatuses can be performed by using IP addresses.

Under this system simplification, QoS of each subscriber can be ensured.

What is claimed is:

1. A demultiplexing method of receiving a multiplexed signal obtained by multiplexing a plurality of communication signals from a multiplexed signal transmitting section, demultiplexing the multiplexed signal into communication signals, and transmitting the demultiplexed communication signals to a communication signal receiving section, the method comprising:

adding, to each of the plurality of communication signals, an identification address preassigned to a predetermined signal identifying section through which a communication signal passes in a multiplexing system, including the multiplexed signal transmitting section and the communication signal receiving section, and outputting each of the communication signals;

extracting the identification address from each of the output signals;

demultiplexing the multiplexed signal for each of the communication signals on a basis of the extracted identification address; and transferring, when the communication signals include a data packet, the data packet to a first interface block, and when the communication signals include a control packet, transferring the control packet to a Point-to-Point Protocol (PPP) processor, wherein, when the communication signals are received through a second interface block and include a data packet, the data packet is transferred to the first interface block on a basis of an IP address of the communication signals, and the data packet is transmitted to a backbone network upon converting the packet into a packet over SDH/SONET (Synchronous Digital Hierarchy/Synchronous Optical Network) (POS) signal, and wherein, when the communication signals in a multiplexed signal received from said demultiplexing apparatus through the second interface block include a control packet, the control packet is transferred to a PPP processor on a basis of an IP address of the control packet.

2. A method according to claim 1, wherein the communication signal includes a PPP packet created for each Internet subscriber apparatus, and the identification address includes an Medium Access Control (MAC) address.

3. A demultiplexing method of demultiplexing a multiplexed signal obtained by multiplexing a plurality of packets into packets, comprising:
    extracting an IP address from each packet in a received multiplexed signal for each of the plurality of packets, the IP address being preassigned to a predetermined signal identifying section through which a communication signal passes;
    demultiplexing the multiplexed signal into PPP packets on a basis of the extracted IP addresses; and
    transferring, when the communication signals include a data packet, the data packet to a first interface block, and when the communication signals include a control packet, transferring the control packet to a PPP processor,
    wherein, when the communication signals are received through a second interface block and include a data packet, the data packet is transferred to the first interface block on a basis of an IP address of the communication signals, and the data packet is transmitted to a backbone network upon converting the packet into a POS signal, and
    wherein, when the communication signals in a multiplexed signal received from said demultiplexing apparatus through the second interface block include a control packet, the control packet is transferred to a PPP processor on a basis of an IP address of the control packet.

4. A demultiplexing apparatus which is connected to a multiplexed signal transmitting section through a multiplex communication path, demultiplexes a multiplexed signal received from the multiplex communication path, and transmits demultiplexed communication signals to a communication signal receiving section through communication paths for respective communication signals, the demultiplexing apparatus comprising:
    address extracting means, connected to the multiplex communication path, for extracting an identification address, for each of the communication signals, which is added to each of the communication signals in the multiplexed signal received from the multiplex communication path and preassigned to a predetermined signal identifying section through which a communication signal passes in a demultiplexing section including said multiplexed signal transmitting section and said communication signal receiving section; and
    demultiplexing means for demultiplexing the multiplexed signal into the respective communication signals on a basis of identification addresses of the respective communication signals which are extracted by said address extracting means,
    wherein, when the communication signals in a multiplexed signal received from said demultiplexing apparatus through a second interface block include a data packet, the data packet is transferred to a first interface block on a basis of an IP address of the communication signals, and the data packet is transmitted to a backbone network upon converting the packet into a POS signal, and
    wherein, when the communication signals in a multiplexed signal received from said demultiplexing apparatus through a second interface block include a control packet, the control packet is transferred to a PPP processor on a basis of an IP address of the control packet.

5. An apparatus according to claim 4, wherein the communication signal includes a PPP packet created for each Internet subscriber apparatus, and the identification address includes an MAC address.

6. The access network system of claim 4, wherein the demultiplexing apparatus further comprises:
    an output interface block to receive the multiplexed signal;
    an output Ethernet interface block to execute an interface function between the demultiplexing apparatus and an access gateway for the extracted identification address;
    an input Ethernet interface block to receive a signal from the access gateway, extract a frame packet and an MAC address from the received signal, and to transfer the extracted frame packet and the MAC address to the demultiplexing means; and
    an input block to execute an interface function with respect to the extracted frame packet to transfer the demultiplexed frame packet to a corresponding subscriber apparatus.

7. The access network system of claim 6, wherein the demultiplexing block demultiplexes the frame packet on a basis of an input MAC address.

8. A demultiplexing apparatus which is connected to a multiplex communication path through which a multiplexed signal obtained by multiplexing packets addressed to subscriber apparatuses is transmitted, demultiplexes the multiplexed signal received from the multiplex communication path, and outputs each demultiplexed communication signal, comprising:
    address extracting means, connected to the multiplex communication path, for extracting an IP address of each packet, the IP address being preassigned to a predetermined signal section of the multiplexed signal received from the multiplex communication path; and
    demultiplexing means for demultiplexing the multiplexed signal into respective packets on a basis of the IP addresses of the respective packets extracted by said address extracting means,
    wherein, when the communication signals in a multiplexed signal received from said demultiplexing apparatus through a second interface block include a data packet, the data packet is transferred to a first interface block on a basis of an IP address of the communication signals, and the data packet is transferred to a backbone network upon converting the packet into a POS signal, and
    wherein, when the communication signals in a multiplexed signal received from said demultiplexing apparatus through a second interface block include a control packet, the control packet is transferred to a PPP processor on a basis of an IP address of the control packet.

9. The access network system of claim 8, wherein the demultiplexing apparatus further comprises:
    an output interface block to receive the multiplexed signal;
    an output Ethernet interface block to execute an interface function with an access gateway for the extracted identification address;
    an input Ethernet interface block to receive a signal from the access gateway, extract a frame packet and an MAC address from the received signal, and to transfer the extracted frame packet and the MAC address to the demultiplexing means; and
    an input block to execute an interface function with respect to the extracted frame packet to transfer the demultiplexed frame packet to a corresponding subscriber apparatus.

10. The access network system of claim 9, wherein the demultiplexing block demultiplexes the frame packet on a basis of an input MAC address.

11. An access network system, comprising:
a plurality of subscriber apparatuses which transmit/receive one of a signal having an MAC address added to a packet and a signal having no MAC address added to a packet;
a subscriber multiplexing/demultiplexing apparatus which multiplexes packets in signals transmitted from said respective subscriber apparatuses on a basis of MAC addresses added to the packets or IP addresses of the packets, and demultiplexes an input multiplexed signal into packets on a basis of one of a MAC address added to each packet and an IP address of each packet; and
a protocol termination apparatus which includes a first interface block which interfaces with a backbone network, second and third interface blocks which interface a multiplexed signal with said subscriber multiplexing/demultiplexing apparatus, switching means, and PPP processing means,
wherein said protocol termination apparatus, when a packet in a multiplexed signal received from said subscriber multiplexing/demultiplexing apparatus through said second interface block includes a data packet, said protocol termination apparatus causes said switching means to switch to transfer the data packet to said first interface block on the basis of one of a MAC address added to the data packet and an IP address of the packet, and transmits the packet to a backbone network upon converting the packet into a POS signal by using said first interface block, and when a packet in a multiplexed signal received from said subscriber multiplexing/demultiplexing apparatus through said second interface block includes a control packet, said protocol termination apparatus causes said switching means to switch to transfer the control packet to said PPP processing means on the basis of one of a MAC address added to the control packet and an IP address of the packet, and causes said PPP processing means to transmit the received control packet through said third interface block and perform PPP processing with said subscriber apparatus through said subscriber multiplexing/demultiplexing apparatus.

12. A system according to claim 11, wherein the packet includes one of an Ethernet frame packet and an IEEE 802.3 frame packet, the data packet includes one of a PPP data packet in the Ethernet frame packet and a PPP data packet in the IEEE 802.3 frame, and the control packet includes one of a PPP control packet in the Ethernet packet and a PPP control packet in the IEEE 802.3 frame.

13. A system according to claim 11, wherein the packet includes one of a PPP packet in an Ethernet frame packet and a PPP packet in an IEEE 802.3 frame packet, the data packet includes one of a PPP data packet in the Ethernet frame packet and a PPP data packet in the IEEE 802.3 frame, and the control packet includes one of a PPP control packet in the Ethernet packet and a PPP control packet in the IEEE 802.3 frame.

14. An access network system, comprising:
a plurality of subscriber apparatuses which transmit/receive one of a signal having an MAC address added to a packet and a signal having no MAC address added to a packet;
a subscriber multiplexing/demultiplexing apparatus which multiplexes packets in signals transmitted from said respective subscriber apparatuses on a basis of MAC addresses added to the packets or IP addresses of the packets so as to output a multiplexed signal as a POS signal, and demultiplexes an input POS signal into packets on the basis of IP addresses of the packets;
an interface which is connected to said subscriber multiplexing/demultiplexing apparatus and transmits a POS signal; and
a protocol termination apparatus which includes a first interface block for interfacing with a backbone network, second and third interface blocks connected to said interface to interface a multiplexed signal with said subscriber multiplexing/demultiplexing apparatus, a switching means, and a PPP processing means,
wherein, when a packet in a multiplexed signal received from said subscriber multiplexing/demultiplexing apparatus through said second interface block includes a data packet, said protocol termination apparatus causes said switching means to switch so as to transfer the data packet to said first interface block on the basis of an IP address of the data packet, and transmits the packet to the backbone network upon converting the packet into a POS signal by using said first interface block, when a packet in a POS signal received from said subscriber multiplexing/demultiplexing apparatus through said second interface block includes a control packet, said protocol termination apparatus causes said-switching means to switch so as to transfer the control packet to said PPP processing means on the basis of an IP address of the control packet, and causes said PPP processing means to transmit the received control packet through said third interface block and perform first PPP processing as PPP processing between said subscriber apparatuses through said subscriber multiplexing/demultiplexing apparatus, and
said protocol termination apparatus transmits a control packet through said second interface block to perform second PPP processing as PPP processing between said protocol termination apparatus and said subscriber multiplexing/demultiplexing apparatus.

15. A system according to claim 14, wherein the packet processed by said subscriber apparatus and the packets multiplexed by said subscriber multiplexing/demultiplexing apparatus include one of Ethernet frame packets and IEEE 802.3 frame packets, and the packets demultiplexed by said subscriber multiplexing/demultiplexing apparatus and the packet processed by said protocol termination apparatus include PPP packets in an SDH/SONET frame transmitted over a POS signal.

16. A system according to claim 14, wherein each of the packets processed by said subscriber apparatus and the packets multiplexed by said subscriber multiplexing/demultiplexing apparatus includes a packet selected from the group consisting of an Ethernet packet, an IEEE 802.3 packet, and a PPP packet in the packet, and one of Ethernet frame packets and IEEE 802.3 frame packets, the packets demultiplexed by said subscriber multiplexing/demultiplexing apparatus and the packet processed by said protocol termination apparatus include PPP packets in PPP packet in PPP packets in an SDH/SONET frame transmitted over a POS signal.

17. A protocol termination apparatus including a first interface block which converts a data packet into a POS signal and transmits the signal to a backbone network, a second interface block which is connected to a subscriber multiplexing/demultiplexing apparatus to which a subscriber apparatus is connected, and receives a transmitted multiplexed signal obtained by causing said subscriber multiplexing/demultiplexing apparatus to multiplex signals which serve to transmit packets created for respective subscriber apparatuses and are received from the subscriber apparatuses, and a third interface block connected to said subscriber multiplexing/demultiplexing apparatus, comprising:

said second interface block which extracts the packet and the MAC address added to one of the packet and an IP address of the packet from the multiplexed signal;

PPP processing means which is connected to said subscriber multiplexing/demultiplexing apparatus through said third interface block and performs a PPP processing between the subscriber apparatuses through said subscriber multiplexing/demultiplexing apparatus; and switching means for, when a packet extracted by said second interface block includes a data packet, transferring the data packet to said first interface block on a basis of one of the MAC address and the IP address of the packet which is extracted by said second interface block, and when a packet extracted by said second interface block includes a control packet, transferring the control packet to said PPP processing means on the basis of one of the MAC address and the IP address of the packet which are extracted by said second interface block.

18. An apparatus according to claim 17, wherein the packet includes one of an Ethernet frame packet and an IEEE 802.3 frame packet.

19. An apparatus according to claim 17, wherein the packet includes one of a PPP packet in an Ethernet frame packet and a PPP packet in an IEEE 802.3 frame packet.

20. A protocol termination apparatus including a first interface block which converts a packet into a POS signal and transmits the signal to a backbone network, a second interface block which is connected, through an interface, to a subscriber multiplexing/demultiplexing apparatus to which a subscriber apparatus is connected, and receives a transmitted multiplexed signal obtained by causing said subscriber multiplexing/demultiplexing apparatus, which has received signals, from the respective subscriber apparatuses, which are used to transmit packets created by the respective subscriber apparatuses, to multiplex the packets, and a third interface block connected to said subscriber multiplexing/demultiplexing apparatus, said interface being an interface which transmits a POS signal, comprising:

said second interface block which extracts a packet in the POS signal and an IP address of the packet;

PPP processing means, connected to said subscriber multiplexing/demultiplexing apparatus through said third interface block, for transmitting a control packet through said third interface block to perform a first PPP processing as a PPP processing between the subscriber apparatuses through said subscriber multiplexing/demultiplexing apparatus, and transmitting the control packet through said third interface block to perform a second PPP processing as the PPP processing with said subscriber multiplexing/demultiplexing apparatus; and switching means for, when a packet extracted by said second interface block includes a data packet, transferring the data packet to said first interface block on a basis of the IP address extracted by said second interface block, and when a packet extracted by said second interface block includes a control packet, transferring the control packet to said PPP processing means on the basis of the IP address extracted by said second interface block.

21. An apparatus according to claim 20, wherein the packet includes a PPP packet in an SDH/SONET frame transmitted over a POS signal.

22. A demultiplexing method of receiving a multiplexed signal obtained by multiplexing a plurality of communication signals from a multiplexed signal transmitting section, demultiplexing the multiplexed signal into communication signals, and transmitting the demultiplexed communication signals to a communication signal receiving section, the method comprising:

adding, to each of the plurality of communication signals, an identification address preassigned to a predetermined signal identifying section through which a communication signal passes in a multiplexing system, including the multiplexed signal transmitting section and the communication signal receiving section, and outputting each of the communication signals;

extracting the identification address from each of the output signals;

demultiplexing the multiplexed signal for each of the communication signals on a basis of the extracted identification address; and transferring, when the communication signals include a data packet, the data packet to a first interface block, and when the communication signals includes a control packet, transferring the control packet to a PPP processor, wherein the communication signal comprises a PPP packet in an Ethernet frame packet or an IEEE 802.3 frame packet, wherein, when the communication signals are received through a second interface block and include a data packet, the data packet is transferred to the first interface block on a basis of an IP address of the communication signals, and the data packet is transmitted to a backbone network upon converting the packet into a POS signal, and wherein, when the communication signals in a multiplexed signal received from said demultiplexing apparatus through the second interface block include a control packet, the control packet is transferred to a PPP processor on a basis of an IP address of the control packet.

23. The demultiplexing method of claim 22, further comprising:

converting the demultiplexed signal into a digital subscriber line (DSL) signal; and transmitting the DSL signal to a corresponding subscriber apparatus.

24. An access network system for performing PPP processing by using a medium access control (MAC) layer, comprising:

a computer;

a subscriber apparatus connected to the computer, said subscriber apparatus adding a PPP (Point-to-Point Protocol) header and an MAC frame header to an IP packet transmitted from the computer to form a frame packet;

a subscriber multiplexing/demultiplexing apparatus connected to the subscriber apparatus;

an access gateway connected to the subscriber multiplexing/demultiplexing apparatus, said access gateway being associated with a backbone network; and an output Ethernet interface block configured to receive a signal, extract a frame packet and an MAC address contained in the signal, and transfer the extracted frame packet and the MAC address in the signal to a packet switch module, wherein the output Ethernet interface block refers to a value indicated by a protocol field of a PPP packet in an extracted frame packet and performs a first discrimination of the PPP packet extracted from the signal as a PPP data packet and a second discrimination of the PPP packet extracted from the signal, and then supplies a discrimination result to a packet switch module, wherein the packet switch module performs switching with respect to the frame packets on a basis of the MAC addresses and discrimination results transferred from the output Ethernet interface block, and performs switching with respect to PPP packets on a basis of the IP addresses transferred from the input interface block, and wherein the MAC frame header comprises an MAC address, said MAC address including a source identification address comprising an identification address of a predetermined identification section through which a communication signal passes in a multiplex system at which a signal is output from the subscriber apparatus and a predetermined destination identification address comprising an identification address of a signal identification section through which a communication signal passes in the multiplex system to which a signal is input into the subscriber multiplexing/demultiplexing apparatus.

25. The access network system of claim 24, wherein the MAC address output from the subscriber apparatus to the subscriber multiplexing/demultiplexing apparatus comprises a destination identification address for identifying a respective input port of the subscriber multiplexing/demultiplexing apparatus and a source identification address for identifying a respective subscriber apparatus.

26. The access network system of claim 24, wherein the subscriber multiplexing/demultiplexing apparatuses comprises:

an output interface block to extract the frame packet and the MAC address added to the packet and to transfer the extracted frame packet and MAC address to a multiplexing block;

an input Ethernet interface block to receive a signal output from an input interface block of the access gateway, extract a frame packet and a MAC address, and transfer the extracted frame packet and MAC address to a demultiplexing block; and an input interface block to execute an interface function with respect to each frame packet demultiplexed by the demultiplexing block for a corresponding subscriber and to transfer the demultiplexed frame packet to a corresponding subscriber apparatus, wherein the multiplexing block multiplexes the frame packets input from the respective interface blocks on a basis of input MAC addresses, and wherein the demultiplexing block demultiplexes the frame packet on a basis of an input MAC address.

27. The access network system of claim 24, wherein the access gateway comprises:

an output interface block to execute an interface function between the access gateway and the backbone network;

an input interface block to execute an interface function with respect to signals received from the backbone network; and an input Ethernet interface block to receive the frame packet or PPP packet switched by the packet switch module, add a frame header comprising a MAC address of the frame, convert the frame packet into an Ethernet signal, and output the Ethernet signal.

28. The access network system of claim 27, wherein the MAC address to be added includes a source identification address comprising an identification address of an identification section through which a communication signal passes in the multiplex system at which a signal is output from the access gateway and a destination identification address comprising an identification address of a signal identification section through which a communication signal passes in the multiplex system at which a signal is input to the subscriber multiplexing/demultiplexing apparatuses.

* * * * *